T. COWBURN.
EGG OPENER.
APPLICATION FILED JUNE 14, 1909.

940,790.

Patented Nov. 23, 1909.

Witnesses.
Thomas J. Drummond
Joseph M. Ward

Inventor.
Thomas Cowburn,
by Gensley Gregory
Att'ys.

UNITED STATES PATENT OFFICE.

THOMAS COWBURN, OF BROCKWORTH, ENGLAND.

EGG-OPENER.

940,790.  Specification of Letters Patent.  Patented Nov. 23, 1909.

Application filed June 14, 1909. Serial No. 501,982.

*To all whom it may concern:*

Be it known that I, THOMAS COWBURN, a subject of the King of Great Britain, residing at Brockworth, Gloucester, England, have invented new and useful Improvements in Egg-Openers, of which the following is a specification.

This invention has reference to a new or improved egg opener, whereby the top or end portion of an egg may be cut off without cracking or splintering the shell.

The invention consists in the employment of one or more yielding scrapers or cutters together with means for guiding said scrapers or cutters so that when applied to an egg the reciprocation or rotary movement of said scrapers or cutters pressing with a yielding pressure on the egg shell will gradually scrape or cut through the shell and enable a portion to be removed.

It will be readily understood that my invention may be carried into effect in various ways and I do not limit the scope of my invention to the construction hereinafter to be described, but which I have found in practice to be very efficient.

The device illustrated in the accompanying drawing comprises three main parts one acting as a guide to the scrapers or cutters, the second as a carrier for the yielding scrapers or cutters, and the third as a means for causing pressure to be applied to the cutters and also to effect when it is reciprocated or moved in a rotary direction the reciprocation or rotary movement of the cutter carrying part and cutters.

Figure 1:
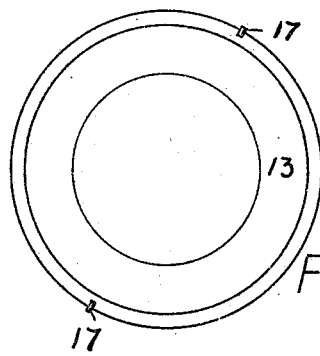
Figure 2:
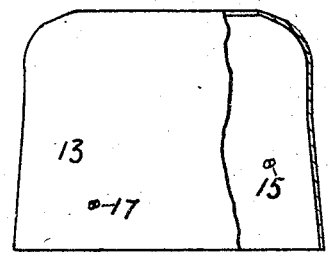
Figure 3:
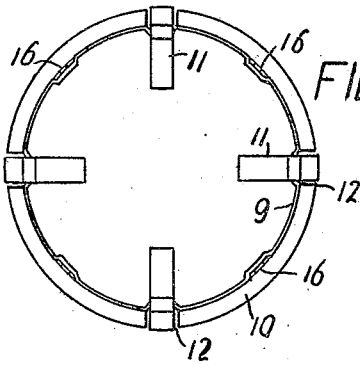
Figure 4:
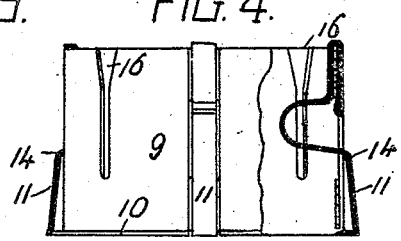
Figure 6:
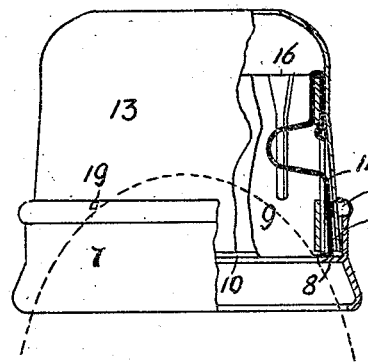
Figure 5:
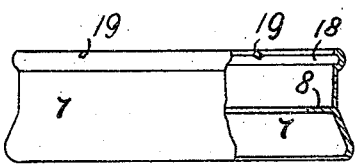

In the accompanying drawing the third part referred to is shown in plan view in Figure 1 and in side elevation partly in section in Fig. 2. Figs. 3 and 4 are similar views of the second or cutter carrying part referred to. Fig. 5 is a side elevation partly in section of the guide, and Fig. 6 is a side elevational view partly in section of the complete device.

Referring to Fig. 5, 7 indicates a metal ring having an annular ledge or platform 8. The central orifice formed by the annular ledge 8 is of a diameter so that when placed upon an egg the guide will rest thereon at about the position where the severance of the top part of the egg is to be effected as indicated in Fig. 6.

Figs. 3 and 4 show the cutter carrier 9 which is approximately of cylindrical form having a flange 10 at its lower end and the external diameter of which is such that it will fit snugly within the carrier 7 and rest on the annular platform 8. Said carrier supports spring cutters or scrapers 11 which may be attached to the carrier in any suitable manner and which spring cutters when in their normal position may extend outwardly from the carrier to be about flush with the edge of the flange 10 the latter being formed with slots 12 to admit said cutters.

The part 13 shown in Figs. 1 and 2 may be in the form more or less of a hood the lower part of which is slightly bell-mouthed or expanded and which hood is to be applied over the carrier 9 its dimensions being such that the spring cutters will be pressed inward by contacting with the part 14 of the spring cutters while the lower portion of the hood is of a diameter to permit outward movement of the free end of the cutters to insure that only a yielding pressure will be applied by the cutters against the egg.

The hood 13 has pins 15 or equivalents which enter in vertical recesses 16 formed externally of the carrier 9 and whereby rotary motion imparted to the hood 13 will be communicated to the carrier 9. The hood 13 is also provided with external projecting pins 17 or equivalents which are intended to enter an annular recess 18 formed at the top of the guide 7, slots 19 permitting the entry of said pins into said recess.

To use the device the part 7 is first placed on the egg and held there by the person about to use the device. The carrier 9 is next placed on to the annular platform 8 after which the hood 13 is applied causing the spring cutters to be pressed with a yielding pressure against the egg. By now reciprocating the hood 13 and with it the carrier 9 and cutters 11 the latter will gradually scrape or cut through the shell the extent of reciprocation being of course such that any two adjacent cutters will overlap in their cutting movement.

It will be understood that the yielding pressure of the cutters is most essential to effect a clean cut through the shell as without such yielding pressure the cutter would be forced through the shell and any reciprocation of the carrier and cutters would cause a splintering up of the shell.

When the cutters have severed the shell the device is removed when it will be found that the top portion of the shell will come off with the device as the spring action of the cutters will cause them to engage under the edge of the part severed.

What I claim as my invention and desire to secure by Letters Patent is:—

1. A new or improved egg opener comprising one or more cutters or scrapers supported by a carrier and adapted to be pressed with a yielding pressure against the egg and a guide to insure said cutters or scrapers moving in the same plane when the carrier is reciprocated for the purpose set forth.

2. A new or improved egg opener comprising a carrier adapted to rotatably fit within or on a guide, cutters or scrapers having a yielding action mounted on said carrier and means whereby said cutters or scrapers may be pressed with a yielding pressure against the egg when the guide is placed on an egg.

3. An egg opener comprising in combination an annular guide member adapted to be placed and held upon the end portion of an egg, a cylindrical cutter-carrier rotatable upon said guide member, cutters movable radially mounted on the said carrier, and means for pressing the said cutters yieldingly against the egg.

4. An egg opener comprising in combination an annular guide member, a cylindrical cutter-carrier rotatable upon said guide member, a plurality of cutters having spring shanks mounted on the said carrier, and hand operable means for pressing the said cutters yieldingly against the egg and at the same time rotating the cutter-carrier, substantially as described.

5. In an egg opener comprising a rotatable cutter-carrier, the combination of radially movable cutters mounted on the carrier and means for pressing the said cutters yieldingly against the egg.

In testimony whereof I have signed my name to this specification in the presence of two subscribing witnesses.

THOMAS COWBURN.

Witnesses:
 EFFIE J. FUSSELL,
 HAROLD J. SHERRIN.